(12) United States Patent
Annamalai et al.

(10) Patent No.: US 10,464,840 B2
(45) Date of Patent: Nov. 5, 2019

(54) NEAR INFRARED SHIELDING AND LASER-RESISTANT WINDOW

(71) Applicant: Corning Incorporated, Corning, NY (US)

(72) Inventors: Sezhian Annamalai, Painted Post, NY (US); Steven Bruce Dawes, Corning, NY (US); Carlos Alberto Duran, Ottawa (CA); Jesse Kohl, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 9 days.

(21) Appl. No.: 15/724,825

(22) Filed: Oct. 4, 2017

(65) Prior Publication Data
US 2018/0273419 A1    Sep. 27, 2018

Related U.S. Application Data (60) Provisional application No. 62/404,357, filed on Oct. 5, 2016.

(51) Int. Cl.
| | | |
|---|---|---|
| C03C 4/08 | (2006.01) | |
| C03C 3/06 | (2006.01) | |
| B64C 1/14 | (2006.01) | |
| F41H 5/26 | (2006.01) | |
| C03C 3/097 | (2006.01) | |
| C03C 4/10 | (2006.01) | |

(52) U.S. Cl.
CPC ............ *C03C 4/082* (2013.01); *B64C 1/1492* (2013.01); *C03C 3/06* (2013.01); *C03C 3/097* (2013.01); *F41H 5/263* (2013.01); *C03C 4/10* (2013.01); *C03C 2201/42* (2013.01)

(58) Field of Classification Search
CPC ..................... C03C 2201/42; C03C 2201/40
See application file for complete search history.

(56) References Cited

U.S. PATENT DOCUMENTS

| | | | |
|---|---|---|---|
| 2,952,575 A | 9/1960 | Baltzer | |
| 3,505,108 A | 4/1970 | Mochel | |
| 4,303,298 A | 12/1981 | Yamashita | |
| 5,668,066 A | 9/1997 | Oguma et al. | |
| 6,048,621 A | 4/2000 | Gallego et al. | |
| 6,342,460 B1 * | 1/2002 | Akimoto | C03B 19/12 501/54 |
| 6,468,934 B2 | 10/2002 | Nagashima et al. | |

(Continued)

OTHER PUBLICATIONS

Author Unkovvn, "Solar Energy Spectrum", accessed from: http://educationcenter.ppg.com/images/glasstopics/LOW-E%20COATING%201.jpg. Retrieved Jan. 2, 2018.

Briganti, "2015 Ushers in the Era of Laser Weapons", accessed from: http://www.defense-aerospace.com/articles-view/feature/5/159975/2015-ushers-in-era-of-laser-weapons.html. Jan. 5, 2014.

(Continued)

*Primary Examiner* — Noah S Wiese
(74) *Attorney, Agent, or Firm* — Russell S. Magaziner (57) ABSTRACT

Near-infrared shielding includes a glass material. The shielding provides transmittance at wavelengths between 390 to 700 nm, but near infrared absorbing species are distributed throughout the glass material and the shielding blocks light in the near infrared range. Further, the glass material has a near zero or negative coefficient of thermal expansion, allowing the glass material to heat up when the shielding is blocking a near infrared laser, without expanding much.

8 Claims, 9 Drawing Sheets

(56) References Cited

U.S. PATENT DOCUMENTS

| | | | |
|---|---|---|---|
| 7,192,897 | B2 | 3/2007 | Yamane et al. |
| 7,294,595 | B2* | 11/2007 | Iwahashi ............ C03B 19/1415 219/553 |
| 7,820,575 | B2 | 10/2010 | Nagashima et al. |
| 8,268,202 | B2 | 9/2012 | Mamak et al. |
| 8,987,155 | B2 | 3/2015 | Annamalai et al. |
| 2002/0072461 | A1 | 6/2002 | Akimoto et al. |
| 2005/0164014 | A1 | 7/2005 | Tomonaga et al. |
| 2005/0179995 | A1* | 8/2005 | Nikolov ............... G02B 5/285 359/359 |
| 2006/0179879 | A1* | 8/2006 | Ellison ............... C03B 19/1415 65/17.4 |
| 2006/0276323 | A1* | 12/2006 | Iwahashi ............ C03B 19/1415 501/54 |
| 2008/0090073 | A1* | 4/2008 | Tomonaga ........... C03C 17/007 428/336 |
| 2014/0066286 | A1* | 3/2014 | Annamalai ............... C03C 3/06 501/54 |
| 2014/0155246 | A1* | 6/2014 | Annamalai ............... C03C 3/06 501/54 |
| 2014/0256865 | A1 | 9/2014 | Boulton et al. |
| 2015/0146057 | A1* | 5/2015 | Konishi ................. G02B 1/04 348/294 |
| 2015/0259239 | A1* | 9/2015 | Annamalai ............... C03C 3/06 501/54 |
| 2016/0137545 | A1* | 5/2016 | Annamalai ............. C03C 3/076 501/54 |
| 2016/0145147 | A1* | 5/2016 | Annamalai ............. C03C 3/112 430/5 |
| 2016/0291223 | A1* | 10/2016 | Rudigier-Voigt ...... G02B 5/223 |
| 2017/0362119 | A1 | 12/2017 | Dejneka et al. |

OTHER PUBLICATIONS

Carley, "Laser Weapons on U.S. Fighter Jets by 2020, Says Air Force" accessed from: http://www.inquisitr.com/2647126/laser-weapons-on-fighter-jets/, Dec. 20, 2015.

Dunn, Ill, "Operational Implications of Laser Weapons" accessed from: http://www.northropgrumman.com/AboutUs/AnalysisCenter/Documents/pdfs/Operational_Implications_of_La.pdf, Sep. 2005.

Efficient Windows Collaborative, "Window Technolgies: Low-E Coatings", accessed from: http://www.efficientwindows.org/lowe.php. Retrieved Jan. 2, 2018.

Mizokami, "Why the American military is so hot on laser weapons", accessed from: http://theweek.com/articles/582035/why-american-military-hot-laser-weapons, Oct. 9, 2015.

Smith, "Optically Transparent IR Reflective Heat Mirror Films of ZnS-Ag-ZnS", Master of Science and Bachelor of Science Thesis, College of Graphic Arts and Photography of the Rochester Institute of Technology, May 1989. 76 pgs.

Tawarayama et al. "Coloration and Decoloration of Tungsten Phosphate Glasses by Heat Treatments at the Temperature Far below Tg", Chem. Mater. 18, 2810-2816 (2006).

U.S. Appl. No. 15/840,040. Dejneka et al. "Articles Including Glass and/or Glass-Ceramics and Methods of Making the Same" Filed Dec. 13, 2017. 42 pages.

Vitro Architechual Glass, "Low E-Glass: Blending antual views with solar efficiency" accessed from: http://www.ppgideascapes.com/Glass/Products/Low-E-Glass.aspx. Retrieved Jan. 2, 2018.

Von Dirke et al. "Cluster formation of WO3 in Li2B4O7 glasses", J. Non Crys. Sol., 124, 265-270 (1990).

Zeng et al. "The preparation of a high performance near-infrared shielding CsxWO3/SiO2 composite resin coating and research on its optical stability under ultraviolet illumination", J. Mater. Chem. C, 3, 8050 (2015).

\* cited by examiner

NEAR INFRARED SHIELDING AND LASER-RESISTANT WINDOW

CROSS-REFERENCE TO RELATED APPLICATIONS

This application claims the benefit of priority under 35 U.S.C. § 119 of U.S. Provisional Application Ser. No. 62/404,357 filed on Oct. 5, 2016 the contents of which are relied upon and incorporated herein by reference in their entirety as if fully set forth below.

BACKGROUND

Aspects of the present disclosure relate generally to shielding, such as near infrared shielding that may resist lasers.

Energy from lasers may be particularly destructive to structures such as vehicles, aircraft, buildings, sensors, and equipment. To counter such threat, shielding may be integrated with such structures, such as in windows functioning as vehicle or aircraft windshields, watercraft portholes, optical domes, face/eye protection (e.g., for welding), oven windows, architectural windows, translucent equipment covers such as camera lens shields, etc. Typically glass material portions (e.g., panes, see-through portions) of such structures are framed or set in a manner to securely support the portions, while maintaining integrity of adjoining structure, such as limiting gas transmission around windows of an aircraft or building, for example. However, if hit by a high-energy beam of a laser, the laser may heat the glass material of the window or other structure, causing the glass material to thermally expand. If framing surrounding the glass material does not facilitate the thermal expansion, resulting stresses may crack or shatter the glass material, damaging the overall structure of which the glass material is a part. Or, in other instances, heat from the laser may be localized to a small spot on the glass material of a window or other structure, causing that spot to expand relative to surrounding glass material, resulting in shear stresses and failure at the interface between hot and cool portions of the glass material.

A need exists for shielding and structures that overcome some or all of the above issues.

SUMMARY

In some embodiments, near-infrared shielding that includes a glass material. The shielding provides transmittance at wavelengths between 390 to 700 nm, but near infrared absorbing species are distributed throughout the glass material and the shielding blocks light in the near infrared range. Further, the glass material has a near zero or negative coefficient of thermal expansion, allowing the glass material to heat up when the shielding is blocking a near infrared laser, without expanding much. In other embodiments, the shielding is in the form of a laser-resistant window. In still other embodiments, the glass material is at least part of an article, that may not be used or intended for shielding.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIG. 4 presents data corresponding to the sample of FIG. 3.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
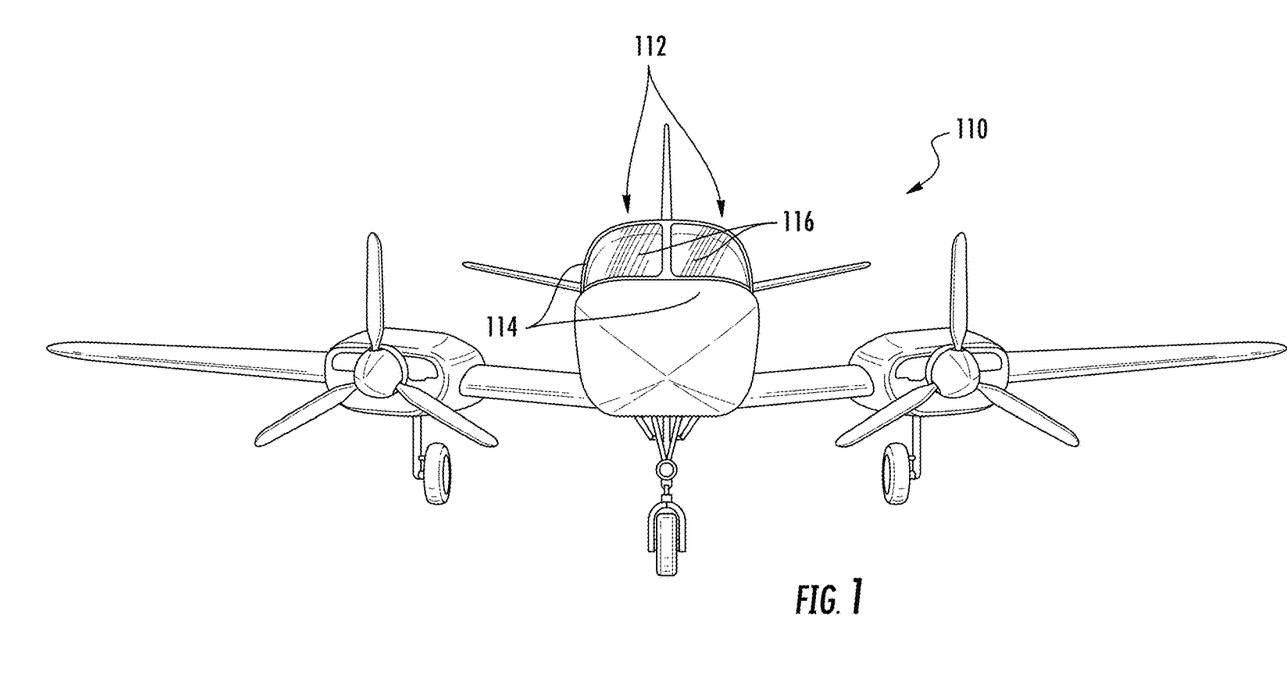
FIG. 1 is a perspective view from the front of an aircraft with a window, according to an exemplary embodiment.
Figure 2:
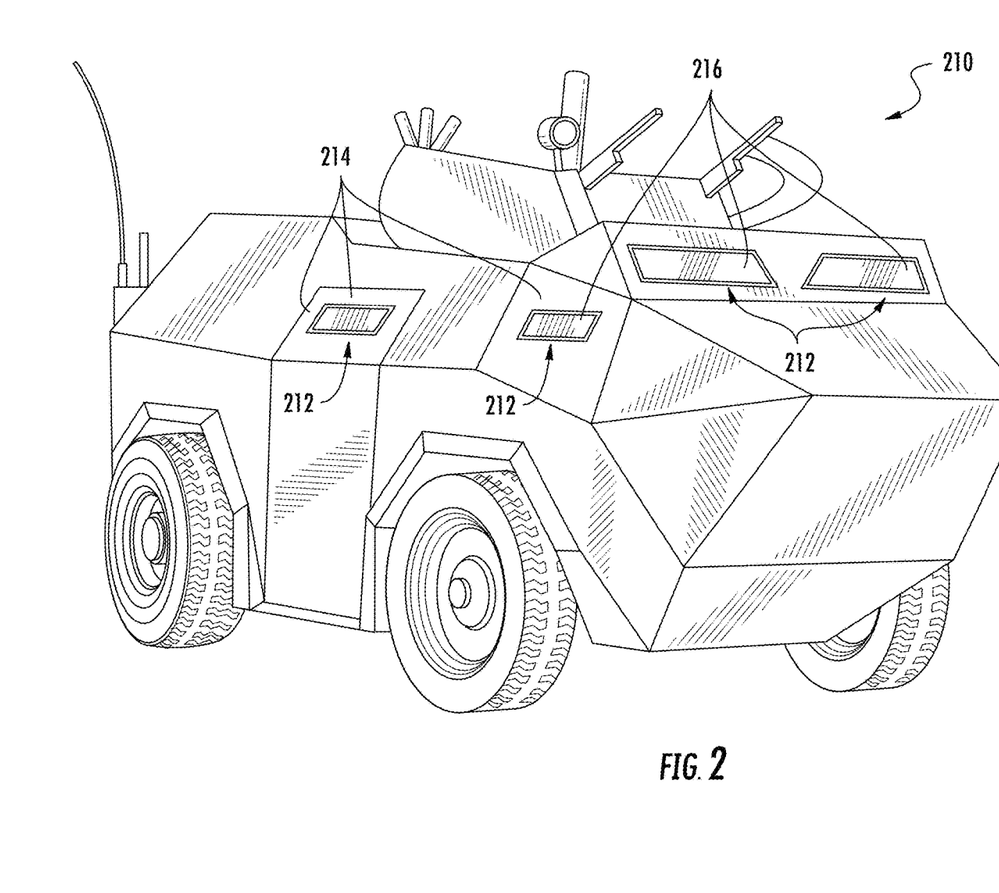
FIG. 2 is a perspective view of an armored vehicle with a window, according to an exemplary embodiment.
Figure 3:
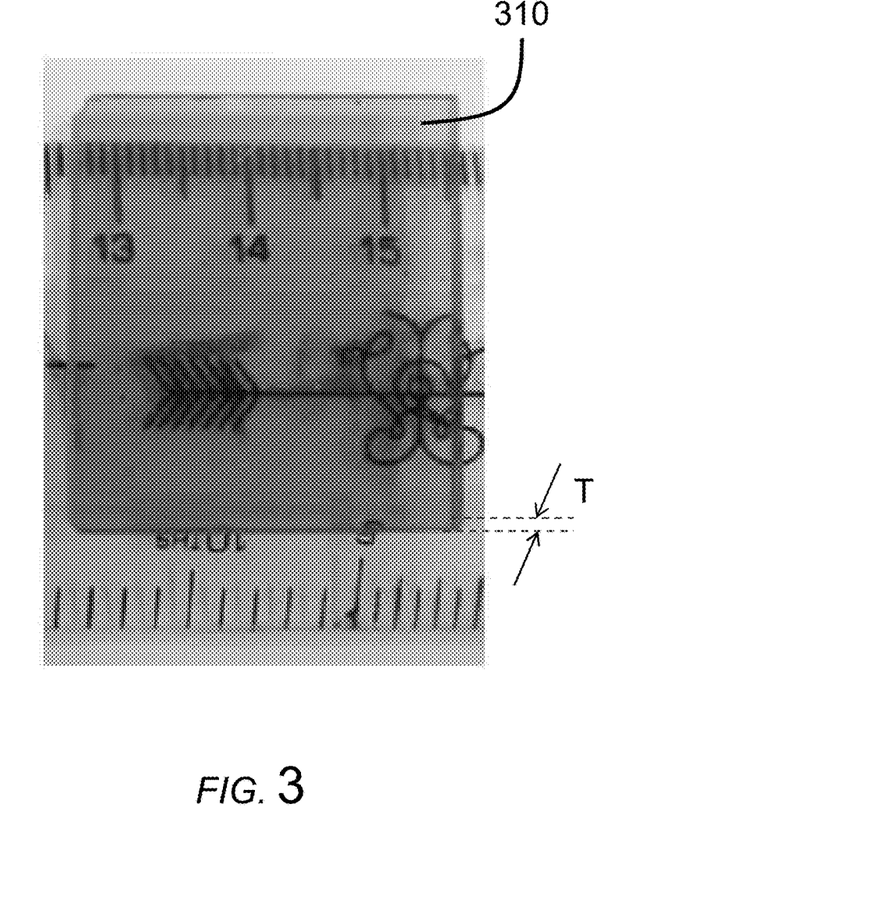
FIG. 3 is a digital image of a sample, according to an exemplary embodiment, beneath a clear ruler.
Figure 8:
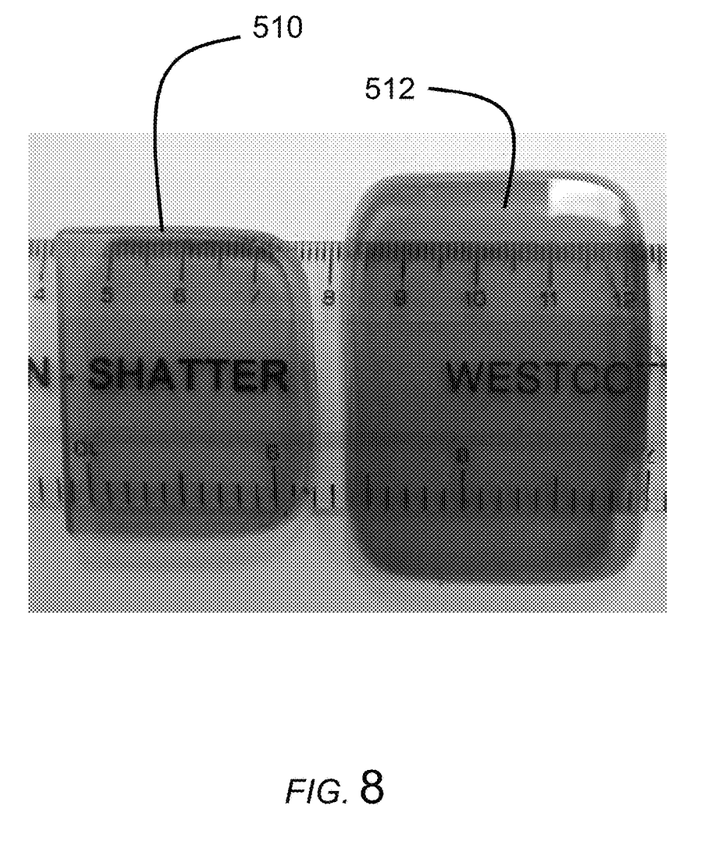
FIG. 8 is a digital image of samples, according to other exemplary embodiments, beneath a clear ruler.

Referring to FIGS. 1-2, near infrared shielding in the form of windows 112, 212 of vehicles 110, 210 include frames/ settings 114, 214 supporting and/or constraining panes 116, 216 of a glass material (see, e.g., glass material 310, 510, 512 as shown in FIGS. 3 and 8). Shielding refers to structures that protect, such as a window that protects occupants from lasers.

In some embodiments the glass material includes infrared absorbing species distributed throughout the glass material, as opposed to a layer or coating of such species on top of or adjoining glass material. Put another way, the glass material in such embodiments is monolithic and/or isotropic, having physical properties disclosed herein (ultraviolet light blocking, infrared blocking, chemical durability, etc.) that are generally the same value when measured in different directions and/or throughout the glass material. As used herein, the term "glass material" is intended to include both amorphous glass and crystallized forms of such constituents, such as glass-ceramic having at least some crystallization.

According to an exemplary embodiment, the glass material is in the form of a doped silica-titania glass material, where the dopant provides the glass material near infrared absorbing and/or reflecting properties that are present throughout the glass material. Distribution of the infrared absorbing species throughout the glass material may increase the robustness of the glass material relative to other structures; however glass materials, as disclosed herein, may be used in combination with other materials, such as additional layers of different (e.g., un-doped) glass materials and/or coatings that provide scratch resistance, improved optical attributes, or other benefits.

In some embodiments, the glass material may be used as laser resistant glazing configured for vehicles 110, 210 or other structures, equipment, etc. In some embodiments, glass material, as described herein, is in the form of a flat or curved sheet, such as the pane 116, 216 having major surfaces of at least 4 cm$^2$, such as at least 9 cm$^2$, at least 16 cm$^2$, at least 25 cm$^2$ in area, whereby occupants of the vehicles, buildings, etc. may use the pane 116, 216 as a viewing window or a portion thereof. In some embodiments, the pane 116, 216 may be such areas in aggregate for a particular vehicle, building, aircraft, etc., where multiple sheets are coupled together within a lattice to form such windows.

Thickness of the sheets of glass material in the pane 116, 216 may be generally uniform (e.g., within±20% of an average thickness) and/or less than 5 cm in thickness, such as less than 1 cm, such as less than 500 mm, but may be more than 10 µm, such as at least 50 µm, such as at least 100 µm, correspondingly providing increased strength and/or wear resistance, such as relative to at least some coatings of laser resistant materials. In some embodiments, the sheets may be curved, such as concave or convex, to fit geometry of the particular frame/setting 114, 214. The perimeter of such pane 116, 216 may be rectangular, round, or otherwise shaped. In contemplated embodiments, the windows 112, 212 may include one or more panes in addition to the pane 116, 216, such as with gaps of air, gas, fluid, or vacuum therebetween, where the pane 116, 216 may be an outermost or exterior facing pane of the respective windows 112, 212.

As used herein, silica, which may be a constituent, component, ingredient, etc. of the glass material, may be denoted $SiO_2$ and titania may be denoted $TiO_2$. With that said, any such constituents having more than one oxidation state may be present in a glass composition in any oxidation state. Put another way, chemical notation descriptions of such components (e.g., $SiO_2$, $TiO_2$, $Ta_2O_5$, $Nb_2O_5$) are a shorthand expressed in terms of a most common or representative oxidation state, such as a lowest prevalent oxidation state, unless otherwise indicated, but intended to cover the other oxidation states of the respective constituents.

According to an exemplary embodiment, constituent composition of the glass material includes silica. In some embodiments, the silica content is at least 10 weight percent, at least 50 weight percent, at least 70 weight percent, at least 80 weight percent, at least 85 weight percent of the total composition of the glass material, and/or no more than 99 weight percent, such as no more than 97 weight percent, such as no more than 95 weight percent of the total composition of the glass material. In contemplated embodiments, the constituent composition may include a positive amount of silica that is less than 10 weight percent or an amount greater than 99 weight percent.

According to an exemplary embodiment, constituent composition of the glass material includes at least 1 weight percent titania, such as at least 3 weight percent, at least 5 weight percent, at least 7 weight percent of the total composition of the glass material, and/or no more than 20 weight percent, such as not more than 15 weight percent, such as not more than 12 weight percent of the total composition of the glass material. In contemplated embodiments, the constituent composition may include a positive amount of titania that is less than 1 weight percent or an amount greater than 20 weight percent.

FIG. 3 shows glass material in the form of a sample 310 of silica-titania glass material doped with an oxide of tantalum. According to an exemplary embodiment, constituent composition of the glass material includes at least 0.2 weight percent $Ta_2O_5$ dopant, such as at least 0.3 weight percent, at least 0.5 weight percent, and/or no more than 10 weight percent, such as not more than 5 weight percent of the total composition of the glass material. In contemplated embodiments, the constituent composition may include a positive amount of $Ta_2O_5$ that is less than 0.2 weight percent or an amount greater than 10 weight percent.

In some embodiments, the tantalum may be doped or co-doped with niobium. According to an exemplary embodiment, constituent composition of the glass material further or alternatively includes at least 0.05 weight percent $Nb_2O_5$ dopant, such as at least 0.1 weight percent, at least 0.3 weight percent, and/or no more than 2 weight percent, such as not more than 1 weight percent of the total composition of the glass material. According to some such exemplary embodiments, constituent composition of the glass material further includes at least 0.05 weight percent $Ta_2O_5$ dopant, such as at least 0.1 weight percent, at least 0.3 weight percent, and/or no more than 10 weight percent, such as not more than 7 weight percent of the total composition of the glass material. In some such contemplated embodiments, the constituent composition may alternatively include a positive amount of $Nb_2O_5$ that is less than 0.05 weight percent or an amount greater than 2 weight percent, and/or a positive amount of $Ta_2O_5$ that is less than 0.05 weight percent or an amount greater than 10 weight percent.

Figure 4:
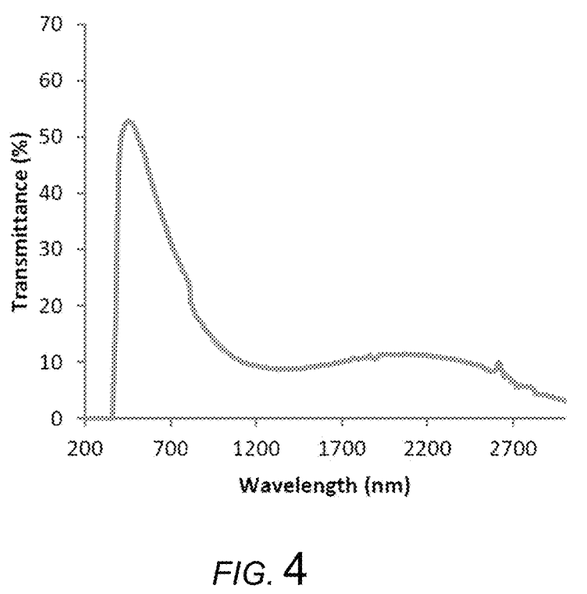
FIGS. 4-7 are plots of wavelength versus transmittance of glass materials according to exemplary embodiments.
Figure 5:
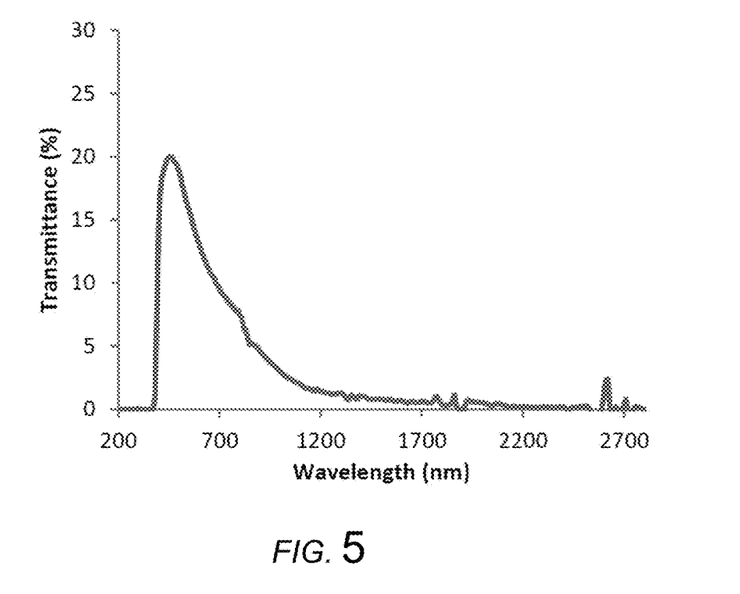

FIGS. 4 and 5 show transmittance of samples glass material according to various exemplary embodiments. More specifically, FIG. 4 is for a 3 mm thick sample of polished, optical flat silica-titania glass material doped with 3 weight percent of $Ta_2O_5$; and FIG. 5 is for a 3 mm thick polished, optical flat of silica-titania glass material co-doped with 2 weight percent of $Ta_2O_5$ and 0.5 weight percent of $Nb_2O_5$. In both Figures, percentage of light transmittance is on the vertical axis and light wavelength is on the horizontal.

According to some exemplary embodiments, the glass material, in the form of silica-titania glass material doped with an oxide of tantalum, is translucent at wavelengths in the visible range, such as allowing transmittance of at least 15% for a 3 mm thick polished, optical flat over at least a portion of the visible spectrum, such as at least 17% for the co-doped sample of FIG. 5 for at least 50% of the visible spectrum between 390 to 700 nm, and at least 45% for the $Ta_2O_5$ doped sample of FIG. 4 for at least 50% of the visible spectrum between 390 to 700 nm.

Still referring to FIGS. 4-5, the embodiments of the glass material 110 represented absorb or otherwise prevent transmittance of ultraviolet light at a wavelength less than 380 nm, such as transmitting less than 5% for a 3 mm thick polished, optical flat over at least a portion of the ultraviolet spectrum of wavelength less than 380 nm, such as less than 2%. And, the glass material absorbs or otherwise prevents transmittance of a substantial portion of near infrared light in the spectrum from 700 to 2500 nm, such as limiting transmittance to less than 20% over a majority (e.g., at least ⅔, at least ¾) of the near infrared spectrum from 700 to 2500 nm wavelength, as was demonstrated for a 3 mm thick polished, optical flat of the glass material, such as less than 20%, such as less than 5% for the co-doped sample of FIG. 3 for example. Possibly more significant for resistance from laser weapons, which may typically operate in the 1 to 2 mm wavelength range, transmittance of the glass material for most wavelengths between 1 and 2 mm is less than 25%, such as less than 15%, such as less than 10%. According to an exemplary embodiment, visible light transmittance percentage for light at a majority of wavelengths between 390 and 700 nm through the window is at least twice greater than near-infrared light transmittance percentage at 2200 nm, such as at least three-times greater, such as at least four-times greater.

Figure 6:
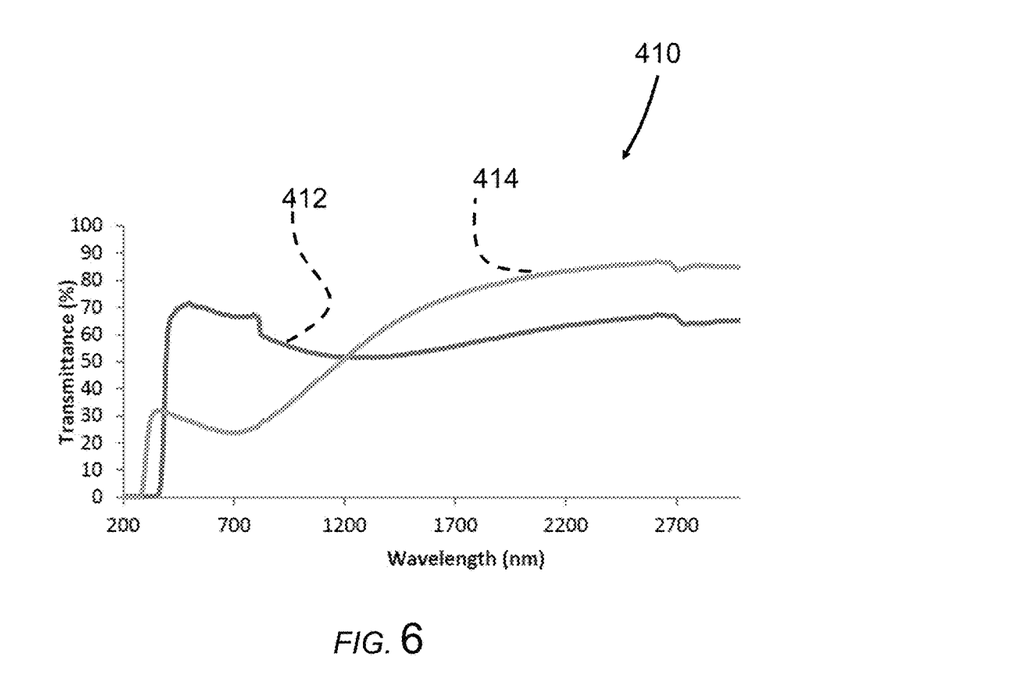
Figure 7:
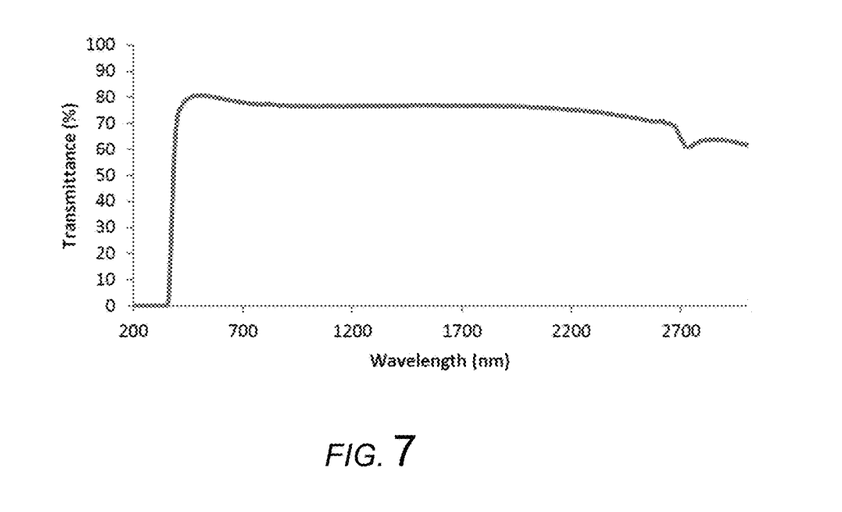

Applicants have found that infrared absorption of the glass material may depend on the dopant in glass materials that use silica and titania as base constitutes. Now referring to FIGS. 6-7, FIG. 6 provides the transmittance spectra 410 of annealed 412 and re-melted 414 fluorine-doped silica-titania glass and FIG. 7 the transmittance spectrum of annealed boron-doped silica-titania glass. In some such embodiments, as shown in FIG. 6, the amount of fluorine is a positive amount up to about 8 weight percent, such as up to about 5 weight percent, and/or at least 50 ppm in weight. In some such embodiments, as shown in FIG. 7, the amount of boron is a positive amount up to about 9 weight percent, such as up to about 6 weight percent, and/or at least 50 ppm in weight.

With both dopants (fluorine and boron), transmittance in the near infrared is comparable to transmittance in the visual range of the spectrum. However, such glass materials may be useful in windows for blocking ultraviolet radiation, especially where greater transmittance in the visual range is beneficial; but may not be particularly well suited for infrared laser resistance. For example, some such windows may block at least 95% of a 100 nm swath of wavelengths in the ultraviolet range of the spectrum (e.g., light of 100 to 200 nm in wavelength), such as having transmittance below 3% transmittance, while transmitting light in a majority of wavelengths in the visual spectrum (e.g., 390 to 700 nm), such as having at least 50% transmittance, such as at least 60% for light of that majority. Further, such glass material has low-thermal-expansion and chemical durability attributes described herein (below) with respect to tantalum and/or niobium doped silica-titania glass material.

Figure 9:
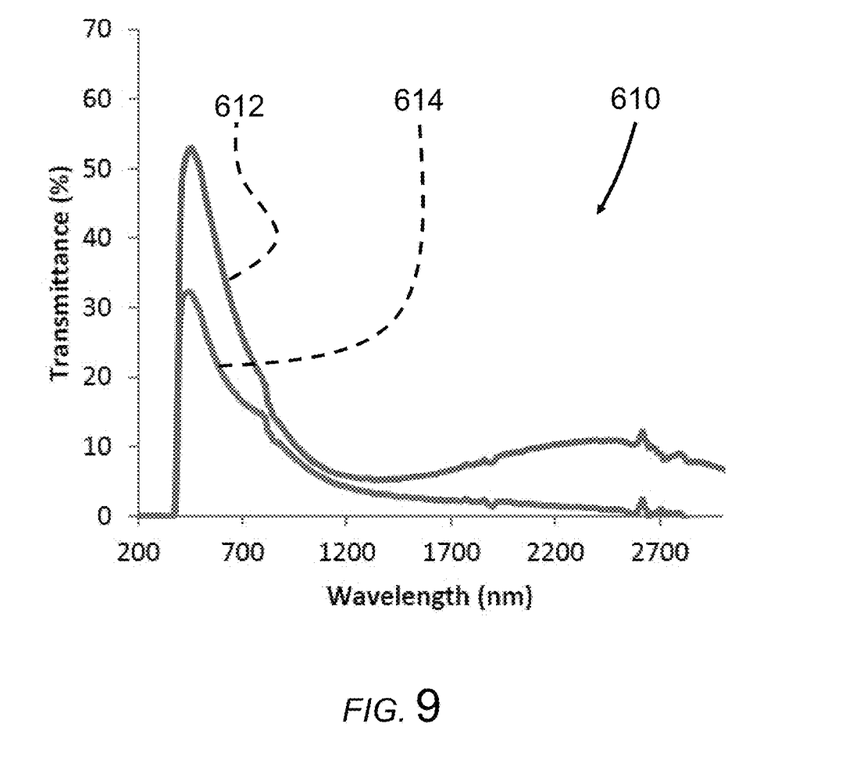
FIG. 9 is a plot of wavelength versus transmittance of glass materials according to exemplary embodiments.

Referring now to FIGS. 8-9, in some embodiment the glass material may be niobium doped as disclosed herein, without tantalum (see also Table 3 below). More specifically, the sample 510 of glass material on the left in FIG. 8 is silica-titania, as described above, with 0.75 weight percent $Nb_2O_5$, and the sample 512 on the right in FIG. 8 is silica-titania, as described above, with 1 weight percent $Nb_2O_5$. The curve 612 in the plot 610 of FIG. 9 is the transmittance spectra of the sample 510 and the curve 614 is the transmittance spectra of the sample 512. As can be seen from the curves 612, 614 the dopant niobium provides benefits for near infrared blocking that are similar to those provided by tantalum.

In contemplated embodiments, the glass material may include tantalum and/or niobium dopants, other transition metal dopants (e.g., dubnium, vanadium), alone or in addition to fluorine and/or boron dopants, or other dopants, such as sodium, potassium, magnesium, calcium, lithium, other alkaline earth metals, or alkali metals, or any combinations of such dopants, where each respective dopant present in the glass material has a positive concentration (e.g., >0.001 wt %) that is less than silica and/or titania in terms of weight percentage. Alternate contemplated embodiments include glass materials such as silica-titania glasses as disclosed herein, with other or additional near infrared absorbing dopants such as iron, copper, tungstates, and or alkali tungsten bronzes, where the dopants have a positive concentration that is less than silica and/or titania in terms of weight percentage.

According to an exemplary embodiment, the glass material (see, e.g., glass material of FIGS. 3 and 8) has near zero or a negative coefficient of thermal expansion, that being less than $200 \times 10^{-9}$/K at temperatures between 0 to 35° C., such as less than $100 \times 10^{-9}$/K at temperatures between 0 to 35° C., such as even less than $50 \times 10^{-9}$/K at temperatures between 0 to 35° C., or even a negative coefficient of thermal expansion at temperatures between 0 to 35° C. and/or no less than $-200 \times 10^{-9}$/K at temperatures between 0 to 35° C., such as no less than $-100 \times 10^{-9}$/K. In other contemplated embodiments, glass material 110 may have a coefficient of thermal expansion that is greater than $200 \times 10^{-9}$/K at temperatures between 0 to 35° C. or less than $-200 \times 10^{-9}$/K at temperatures between 0 to 35° C.

In some embodiments, the mean coefficient of thermal expansion at temperatures between 5 to 35° C. is within $200 \times 10^{-9}$/K of zero, such as within $100 \times 10^{-9}$/K of zero, such as within $50 \times 10^{-9}$/K of zero. As discussed above, the near zero coefficient of thermal expansion may be particularly beneficial for laser resistant glazing at least because energy absorbed from a laser may then be insufficient to cause the glass material to significantly strain and fail.

Tables 1 and 2 below are both of samples of glass material including tantalum-doped silica-titania, but made by different methods, as discussed below. More specifically, the glass materials of Table 1 were made via sol gel preparation and the glass materials of Table 2 were made via spray drying. Table 3 includes samples of glass material including niobium doped silica-titania. The composition of the samples was analyzed for $TiO_2$ and $Ta_2O_5$ content by inductively coupled plasma mass spectrometry and $SiO_2$ content by gravimetry. OH content was measured by Fourier transform infrared spectroscopy. Coefficient of thermal expansion (CTE) may be measured via the Fabry-Perot method. Tables 1-3 summarize the OH content, ΔCTE (ppb/K), and ΔCTE slope (ppb/K²) for various samples of glass material, according to various embodiments, with different constituent percentages. The Δ refers to difference of the CTE and CTE slope, respectively, relative to CTE of $0 \pm 30 \times 10^{-9}$/K between 0 to 35° C. and CTE slope of $1.6 \times 10^{-9}$/K², thermal expansion properties of an undoped silica-titania glass material. The unit parts per billion (ppb) means "$\times 10^{-9}$" in the present usage. The unit "ppmwt" means parts per million in weight. The unit "wt %" means percentage of the weight. Tables 1-3 include some blank spaces which denote absent data, not a zero value.

TABLE 1

| | Concentration (Wt %) | | | OH | ΔCTE | ΔCTE slope |
|---|---|---|---|---|---|---|
| Samples | $Ta_2O_5$ | $TiO_2$ | $SiO_2$ | (ppmwt) | (ppb/K) | (ppb/K²) |
| A1 | 0.47 | 7.21 | 92.32 | 78 | −58 | +0.34 |
| A2 | 0.50 | 7.33 | 92.17 | 84 | | |
| A3 | 0.96 | 7.11 | 91.93 | 89 | | |
| A4 | 0.95 | 7.29 | 91.76 | 99 | | |
| A5 | 0.99 | 7.19 | 91.82 | 60 | −59 | +0.3 |
| A6 | 1.87 | 7.13 | 91.00 | 72 | −43 | +0.32 |
| A7 | 2.03 | 7.14 | 90.84 | 72 | | |
| A8 | 1.95 | 7.21 | 90.85 | 88 | | |
| A9 | 2.87 | 7.07 | 90.06 | 66 | −4 | +0.26 |
| A10 | 2.90 | 7.12 | 89.97 | 68 | | |
| A11 | 3.78 | 6.80 | 89.42 | | | |
| A12 | 3.88 | 7.08 | 89.04 | | | |
| A13 | 3.79 | 7.08 | 89.13 | | | |

TABLE 1-continued

| Samples | Concentration (Wt %) | | | OH (ppmwt) | ΔCTE (ppb/K) | ΔCTE slope (ppb/K²) |
|---|---|---|---|---|---|---|
| | Ta₂O₅ | TiO₂ | SiO₂ | | | |
| A14 | 4.20 | 7.01 | 88.79 | | | |
| A15 | | 7.25 | 92.75 | 75 | −49 | +0.4 |
| A16 | | 7.24 | 92.76 | | | |

TABLE 2

| Samples | Concentration Wt %) | | | OH (ppmwt) | ΔCTE (ppb/K) | ΔCTE slope (ppb/K²) |
|---|---|---|---|---|---|---|
| | Ta₂O₅ | TiO₂ | SiO₂ | | | |
| B1 | 1.12 | 7.22 | 91.66 | 50.7 | −28 | +0.3 |
| B2 | 1.80 | 7.22 | 90.98 | | | |
| B3 | 1.94 | 7.02 | 91.04 | 63.4 | | |
| B4 | 3.20 | 7.27 | 89.53 | 58.2 | | |
| B5 | 3.94 | 6.96 | 89.10 | 46.3 | | |
| B6 | 4.84 | 6.76 | 88.4 | | | |

TABLE 3

| Sample | Nb₂O₅ wt % | TiO₂ wt % | SiO₂ wt % | OH (ppmwt) | ΔCTE (ppb/K) | ΔCTE Slope (ppb/K²) |
|---|---|---|---|---|---|---|
| C1 | 1.09 | 7.22 | 91.68 | | 216 | 2.22 |
| C2 | 1.02 | 7.27 | 91.71 | | | |
| C3 | 0.81 | 7.22 | 91.97 | 53 | | |
| C4 | 0.79 | 7.30 | 91.90 | 32 | 99 | 1.88 |
| C5 | 0.72 | 7.08 | 92.20 | 11 | 60 | 1.84 |
| C6 | 0.80 | 7.32 | 91.87 | 27 | | |
| C7 | 0.80 | 7.49 | 91.71 | 37 | | |
| C8 | 0.62 | 7.26 | 92.12 | | | |
| C9 | 0.82 | 7.23 | 91.95 | 24 | | |
| C10 | 0.53 | 7.27 | 92.20 | 54 | −25 | 1.82 |
| C11 | 0.57 | 7.31 | 92.12 | 69 | | |
| C12 | 0.26 | 7.24 | 92.50 | 26 | −51 | 1.9 |
| C13 | 0.27 | 7.17 | 92.56 | 65 | | |
| C14 | 0.28 | 7.28 | 92.44 | 66 | | |
| C15 | 0.13 | 7.24 | 92.63 | 59 | −54 | 1.9 |
| C16 | 0.17 | 7.22 | 92.61 | 16 | | |
| C17 | | 7.25 | 92.75 | 75 | −49 | 2.0 |
| C18 | | 7.24 | 92.76 | | | |

In addition to the samples of glass material as provided in Tables 1-3, Applicants also prepared a co-doped sample with 0.49 wt % $Nb_2O_5$, 1.88 wt % $Ta_2O_5$, 7.15 wt % $TiO_2$, and 90.48 wt % $SiO_2$. The CTE was estimated to be 140 ppb/K and CTE slope was 1.92 ppb/K².

As can be seen in the Tables 1-3, the glass material of the samples had low thermal expansion coefficients and slopes, near zero, and low OH content. As discussed, low-thermal-expansion glass materials may be used in windows potentially threatened by lasers. Low slope of CTE may correspond to improved performance of glass material due to rapid temperature change, such as upon sudden receipt of laser energy. Low OH content may improve dielectric properties of the glass material and/or may influence thermal properties of the glass material. According to an exemplary embodiment, the glass material has OH less than 200 ppmwt, such as less than 150 ppmwt, such as less than 100 ppmwt, and/or at least 2 ppmwt, such as at least 5 ppmwt, such as at least 10 ppmwt.

According to an exemplary embodiment, glass material, as disclosed herein, has chemical durability, such as resistance to weathering, exhibiting little to no surface clouding or electrical surface leakage when exposed to water, sulfur dioxide, and/or atmospheric gases. Further, the glass material resists chemical agents.

In some contemplated embodiments, exposure of glass material, as disclosed herein, to a solution of 5% HCl at 95° C. for 24 hours results in less than 0.1 mg/cm² of weight loss, such as less than 0.05 mg/cm² of weight loss, such as less than 0.01 mg/cm² of weight loss of the glass material upon standard ASTM chemical durability testing (see ASTM C1285).

In some contemplated embodiments, exposure of glass material, as disclosed herein, to a solution of 5% NaOH at 95° C. for 6 hours results in less than 2 mg/cm² of weight loss, such as less than 1.5 mg/cm² of weight loss, such as less than 1 mg/cm² of weight loss upon standard ASTM chemical durability testing (see ASTM C1285).

In some contemplated embodiments, exposure of glass material, as disclosed herein, to a solution of 0.02N $Na_2CO_3$ at 95° C. for 6 hours results in less than 0.15 mg/cm² of weight loss, such as less than 0.09 mg/cm² of weight loss, such as less than 0.04 mg/cm² of weight loss of the glass material upon standard ASTM chemical durability testing (see ASTM C1285).

In some contemplated embodiments, exposure of glass material, as disclosed herein, to a solution of 5% $H_2SO_4$ at 95° C. for 24 hours results in less than 0.1 mg/cm² of weight loss, such as less than 0.05 mg/cm² of weight loss, such as less than 0.01 mg/cm² of weight loss of the glass material upon standard ASTM chemical durability testing (see ASTM C1285).

In some contemplated embodiments, exposure of glass material, as disclosed herein, to a solution of 5% $H_2O$ at 95° C. for 24 hours results in less than 0.1 mg/cm² of weight loss, such as less than 0.05 mg/cm² of weight loss, such as less than 0.01 mg/cm² of weight loss of the glass material upon standard ASTM chemical durability testing (see ASTM C1285).

According to an exemplary embodiment, the glass materials disclosed herein have particularly high softening point temperatures, allowing the glass materials to absorb much laser energy and heat up, without softening. According to an exemplary embodiment, the softening point of the glass material is at least 1200° C., such as at least 1300° C., such as 1400° C.

Preparation of tantalum-doped and/or niobium doped samples of glass materials employed a sol-gel technique, which included a basic aqueous solution of tetra-methylammonium hydroxide as a solvent to prepare the sol. Tantalum compounds, e.g. $TaCl_5$, soluble in absolute alcohols and corresponding sample preparation methods involving alcohols as solvents are included in the present disclosure. Solution doping was used to manufacture some samples disclosed herein. Also, doped powders were made using the spray drying process and these dry powders were later pressed into pellets and consolidated into glass material. Applicants found that spray drying was very faster than the sol-gel method, but less efficient as at least 25% of the input materials were lost during the process. Tantalum compounds in aqueous solutions were used and the sol-gel method was also used in preparing the tantalum-doped samples. Applicants found spray-drying/pressing and sol-gel methods more useful than solution doping in preparing characterization samples and samples containing 0.5 to 4.8 wt % tantalum.

According to exemplary manufacturing methods, titania-silica soot was prepared by oxidation and reaction between a silica precursor, octamethylcyclotetrasiloxane (OMCTS), and a titania precursor, tetraisopropyl titanate (TPT), in an oxidizing flame. The soot had a uniform surface area of about 25 m²/g and a uniform titania content of about 7.4 wt %. Oven drying, burn out or pre-sinter, consolidation and annealing were carried out as well.

According to exemplary manufacturing methods, dry undoped titania-silica soot was pressed into pellets 1-inch or 2-inch diameter and half-inch thickness in a hydraulic press using stainless steel molds. Green density of these pellets was approximately 0.9 g/cc. These pellets were later oven dried at 120° C. for 2 hours and then pre-sintered at 800° C. for 30 minutes.

Based on weight of the soot pellet the required amount of dopant, in the form of $TaCl_5$, was weighed and dissolved in absolute ethanol. Only minimum amounts of ethanol required to completely dissolve the $TaCl_5$ powder were used. Pre-sintered pellet was then left immersed in the dopant solution, until the solution was completely absorbed by the pellet. The pellet was left to dry at room temperature in the fume hood overnight. The next day it was dried at 120° C. for 2 hours. After oven drying the pellets are pre-sintered at 800° C. for 30 minutes. Pre-sintered pellets were consolidated at 1670° C. for 1 hour.

According to other manufacturing method embodiments, there are four steps in the spray drying process: (1) dispersing slurry in to a controlled drop size spray, (2) mixing the spray and a drying medium, (3) drying of the spray, and (4) separation of the dried product and drying medium. A Buchi B 290 Mini Spray Dryer was used with an inert loop attachment (B 295) that enables spray drying of organic solvent based slurries. Nitrogen gas was used as the drying medium to avoid combustion of ethanol, which was used as solvent. The inert loop condenses and traps the ethanol vapors into liquid without exhausting the liquid. The oxygen content within the system is very closely monitored and controlled to ensure safe operation.

According to exemplary manufacturing methods, $TaCl_5$ was weighed and dissolved in ethanol in a dry box. Titania-silica soot was weighed and added to this alcohol-dopant solution and mixed to form a homogeneous slurry. Generally 100 g of soot batch was made up to 500 ml in volume with absolute ethanol. Thin slurry helped avoid plugging of the spray nozzle. The slurry was continuously stirred on a magnetic stirrer to avoid settling of the soot particles. The slurry was mixed for about 10 minutes before starting the spray drying process. The following parameters were used for spray drying alcohol based tantalum doped titania-silica slurries: solids loading at 20 weight over volume percent, inlet temperature at 130° C., pump rate at 50 to 60%, pressure drop at 10 mbar, and nitrogen flow at 40 mm (475 standard liter per hour).

According to exemplary manufacturing methods, slurry was pumped into the nozzle and sprayed into an atomized mist using hot, at inlet temperature, nitrogen gas. This equipment is a co-current drier, meaning that the drying medium and the spray flow into the main chamber, where the slurry is dried, in the same direction. The dried powder was then flown through a cyclone chamber and collected at the bottom of the cyclone in a product collection vessel. The rest of the hot air and finer particles were sent through a PolyTetraFluoroEthylene (PTFE) filter, which filters out fine particles and allows hot gas to pass through to an aspirator and eventually to the inert loop. About 70 to 75 wt % of the solids were recovered in the product collection vessel. The rest were at the liquid collection chamber, just below the main chamber for collecting slurry and wet droplets, or at the outlet filter.

According to exemplary manufacturing methods, only powder collected from the product collection vessel was used for further processing. This powder was composed of generally round or spherical particles of an average diameter of 50 nm, the size of starting silica-titania soot. Dopant, in this embodiment tantalum, was also seen to form atomic clusters on the surface of these soot particles, providing generally uniform distribution of the dopant. Surface area of the spray dried powders varied between 24 and 27 $m^2/g$, similar to surface area of the titania-silica soot.

In some exemplary manufacturing methods, spray dried powder was pressed into pieces in a hydraulic press that were about 3-by-2-by-¾ inches or about 3.5 inches in diameter by ¾ inch. No binder was added to aid in compaction. A pressurizing load of about 5000 lbs. was applied and maintained for about one minute. Resultant samples had a density of about 0.9 g/cc.

According to exemplary manufacturing methods, pressed samples were dried at 120° C. for 2 hours. Applicants have found that since these samples were pressed using dry powder, an oven drying step may be skipped if the samples are pre-sintered immediately after dry pressing. After oven drying, the samples were pre-sintered at 800° C. for 30 minutes. This pre-sintering schedule is to be followed if samples/disks are pre-sintered with sol-gel samples. Otherwise a faster schedule, as follows, can be used: (1) 20 to 120° C. in 3 hours and hold at 120° C. for 3 hours, (2) 120 to 800° C. in 7 hours and hold at 800° C. for 30 minutes, and (3) cool at furnace rate. According to exemplary manufacturing methods, pre-sintered samples were consolidated at 1670° C. Some of the samples were subjected to a second melting step which made them much clearer than earlier. The second consolidation was done in a flowing argon atmosphere with a maximum temperature of 1670° C.

According to exemplary manufacturing methods, consolidated samples were annealed by cooling the samples from 1050 to 700° C. at the rate of 3° C. per hour. Notably, during this annealing Applicants believe near-infrared absorbing properties developed, which in some embodiments is accompanied by a shift from a brownish/gold color to blue of the respective glass material.

According to exemplary manufacturing methods, initial phases of a sol-gel process include mixing to form a stable colloidal solution, sol, of titania-silica soot in an aqueous solution. This may be accomplished by adding an aqueous solution of a strong base to titania-silica powder and mixing thoroughly to eliminate agglomerations. Dopant may be incorporated into the dispersion to form a homogeneous sol in such embodiments, where the dopant may be dissolved in the solvent, such as dilute aqueous solution of tetramethyl-ammonium hydroxide (TMAH). However, Applicants believe $TaCl_5$ is generally insoluble in TMAH. Hence Applicants first dissolved $TaCl_5$ in absolute ethanol, a minimum amount of ethanol to completely dissolve $TaCl_5$. Then, this alcohol solution was added to the sol, using a pipette or burette while the sol was being mixed on a magnetic stirrer.

To retain a stable dispersion of soot, Applicants have found it helpful to maintain the pH of the slurry at a level greater than 12.5. A balance to be maintained is that the dopant should form a stable solute in the base solvent, while not inducing a large pH shift that can stabilize the sol—in other words "gel" the sol. High acidity of the $TaCl_5$ in ethanol may be due to the reaction to form HCl along with tantalum ethoxide: $2TaCl_5$ plus $10\ C_2H_5OH$ yields $(C_2H_5O)_{10}Ta_2$ plus $10HCl$. Applicants have found that in addition to TMAH based stock solutions, the basic nature of TMAH favors this reaction as it neutralizes HCl to produce tetra methyl ammonium chloride and water. Tatalum ethoxide reacts with water to form $Ta_2O_5$ gel such that $Ta_2(OC_2H_5)_{10}$ plus $5\ H_2O$ yields $Ta_2O_5$ plus $10\ C_2H_5OH$. Accordingly, Applicants have found that to obtain stable sols with higher amounts of TaCl$_5$, the concentration of TMAH in the solvent may be increased by replacing part of the solvent, TMAH stock solution, with original undiluted TMAH solution. For un-doped titania-silica samples, 67 g of TMAH stock solution was used for 100 g of titania-silica soot, which amounts to 2.21% TMAH. TMAH concentration in the solvent for higher amounts of TaCl$_5$ in the sol may be as follows: 2.21 wt % TMAH with 0 wt % Ta$_2$O$_5$, 3.30 wt % TMAH with 0.5 wt % Ta$_2$O$_5$, 5.47 wt % TMAH with 1 wt % Ta$_2$O$_5$, 7.63 wt % TMAH with 2 wt % Ta$_2$O$_5$, 8.72 wt % TMAH with 3 wt % Ta$_2$O$_5$, 9.80 wt % TMAH with 4 wt % Ta$_2$O$_5$, and 10.67 wt % TMAH with 4.5 wt % Ta$_2$O$_5$. The sol, containing the titania-silica soot, solvent, and dopant (e.g., dopant salt), was then mixed for about 30 seconds to ensure full incorporation of the powder into the liquid so that the entire slurry was of a smooth, paint-like consistency and appearance. The slurry was then rolled on a roller mill (without grinding media) overnight in order to minimize agglomerations and increase homogeneity.

While many embodiments of glass material of the present disclosure include infrared absorbent species (e.g., tantalum), low-thermal-expansion glasses without such constituents may be coated with ultraviolet and/or near-infrared absorptive coatings that do include such constituents and may be used with windows as disclosed herein. Some such coatings may include commercially-available Epolight™ manufactured by Epolin for example. Others may include pure metals (e.g., copper, silver, and aluminum), metal oxides (e.g., iron oxide), nitrides, or sulfides (e.g., AlO(OH) on aluminum, and AgS on silver), and multilayered or nanostructured coatings (e.g., TiO$_2$/Au/TiO$_2$, silicon powder and plasmonic metal nanoparticles). While presently disclosed, such may not include some advantages of the glass material including infrared absorbing species distributed throughout the glass material because coatings can wear off, corrode in moisture or oxygen, may be particularly susceptible to chemical attack, or may delaminate or otherwise fail. Accordingly, many exemplary embodiments disclosed herein achieve ultraviolet and/or near-infrared blocking (e.g., absorption or reflection), as disclosed herein, without need of a coating for such purpose.

With that said, glass materials, as disclosed herein, may also be coated, such as to further enhance or alter the optical properties. In such an embodiment, a reflective near infrared coating may give the glass material a first level of protection against near-infrared lasers, for example. Then, if the coating becomes damaged or fails, the glass material itself is near infrared absorbing and may further withstand exposure due to low CTE, as disclosed herein. Additionally, employing a near-infrared reflective coating may help balance thermal load between the reflective coating and the bulk glass material.

The construction and arrangements of the glazing, glass material, and methods in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. Near-infrared shielding comprising a glass material, wherein the shielding is translucent in the visible range such that the shielding provides at least 20% transmittance at some or all wavelengths between 390 to 700 nm, wherein near infrared absorbing species are distributed throughout the glass material of the shielding, wherein the shielding blocks light in the near infrared range such that transmittance at some or all wavelengths between 700 and 2500 nm is less than 20% and transmittance for most wavelengths between 1 and 2 mm is less than 15%, and wherein the glass material of the shielding has a near zero or negative coefficient of thermal expansion, that being less than $200 \times 10^{-9}$/K at temperatures between 0 to 35° C.;
   wherein the shielding has a thickness that is at least 0.5 mm and less than 5 cm and a major surface having an area of at least 4 cm$^2$, whereby the shielding is configured for use as a laser-resistant window;
   wherein the glass material is doped silica-titania with constituent composition, comprising:
     at least 0.2 weight percent dopant, wherein the dopant comprises an oxide of tantalum, and wherein the oxide of tantalum is at least 0.5 weight percent and no more than 5 weight percent of the constituent composition of the glass material;
     at least 5 weight percent titania; and
     silica, wherein the silica is the greatest constituent by weight percentage.

2. The shielding of claim 1, wherein the silica of the glass material is greater than 85 weight percent of the constituent composition.

3. The shielding of claim 1, wherein the titania is at least 7 weight percent and no more than 12 weight percent of the constituent composition of the glass material.

4. The shielding of claim 1, wherein the constituent composition is free of halogen and alkali dopants.

5. Near-infrared shielding comprising a glass material with constituent composition, comprising:
   at least 0.5 weight percent and no more than 5 weight percent an oxide of tantalum;
   at least 5 weight percent titania; and
   silica, wherein the silica is the greatest constituent by weight percentage,
   wherein the shielding has a thickness that is at least 0.5 mm and less than 5 cm and a major surface having an area of at least 4 cm$^2$, and wherein the shielding provides at least 20% transmittance at some or all wavelengths between 390 to 700 nm, transmittance at some or all wavelengths between 700 and 2500 nm less than 20%, and transmittance for most wavelengths between 1 and 2 mm less than 15%.

6. The shielding of claim 5, wherein the silica of the glass material is greater than 85 weight percent of the constituent composition.

7. The shielding of claim 5, wherein the titania is at least 7 weight percent and no more than 12 weight percent of the constituent composition of the glass material.

8. The shielding of claim 5, wherein the constituent composition is free of halogen and alkali dopants.

* * * * *

UNITED STATES PATENT AND TRADEMARK OFFICE
CERTIFICATE OF CORRECTION

PATENT NO. : 10,464,840 B2
APPLICATION NO. : 15/724825
DATED : November 5, 2019
INVENTOR(S) : Sezhian Annamalai et al.

It is certified that error appears in the above-identified patent and that said Letters Patent is hereby corrected as shown below:

On the Title Page

Column 2, item (56), Other Publications, Line 1, delete "Unkovvn," and insert -- Unknown, --, therefor.

On page 2, Column 2, item (56), Other Publications, Line 4, delete "Ill," and insert -- III, --, therefor.

On page 2, Column 2, item (56), Other Publications, Line 7, delete "Technolgies:" and insert -- Technologies: --, therefor.

Signed and Sealed this
Eighteenth Day of February, 2020

Andrei Iancu
*Director of the United States Patent and Trademark Office*